Figure 1:
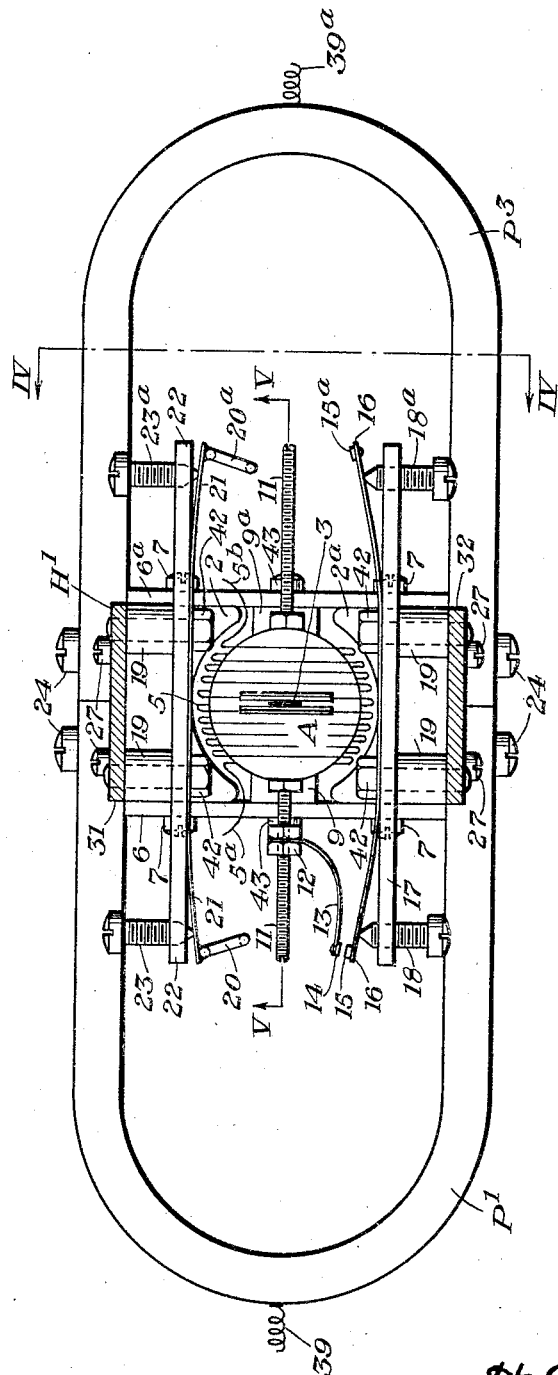

Dec. 3, 1929.  H. O. HOLTE  1,737,761
ELECTRORESPONSIVE DEVICE
Filed July 22, 1924  3 Sheets-Sheet 1

INVENTOR:
H. O. Holte,
BY A. L. Vencill
His ATTORNEY

Dec. 3, 1929.  H. O. HOLTE  1,737,761
ELECTRORESPONSIVE DEVICE
Filed July 22, 1924   3 Sheets-Sheet 2
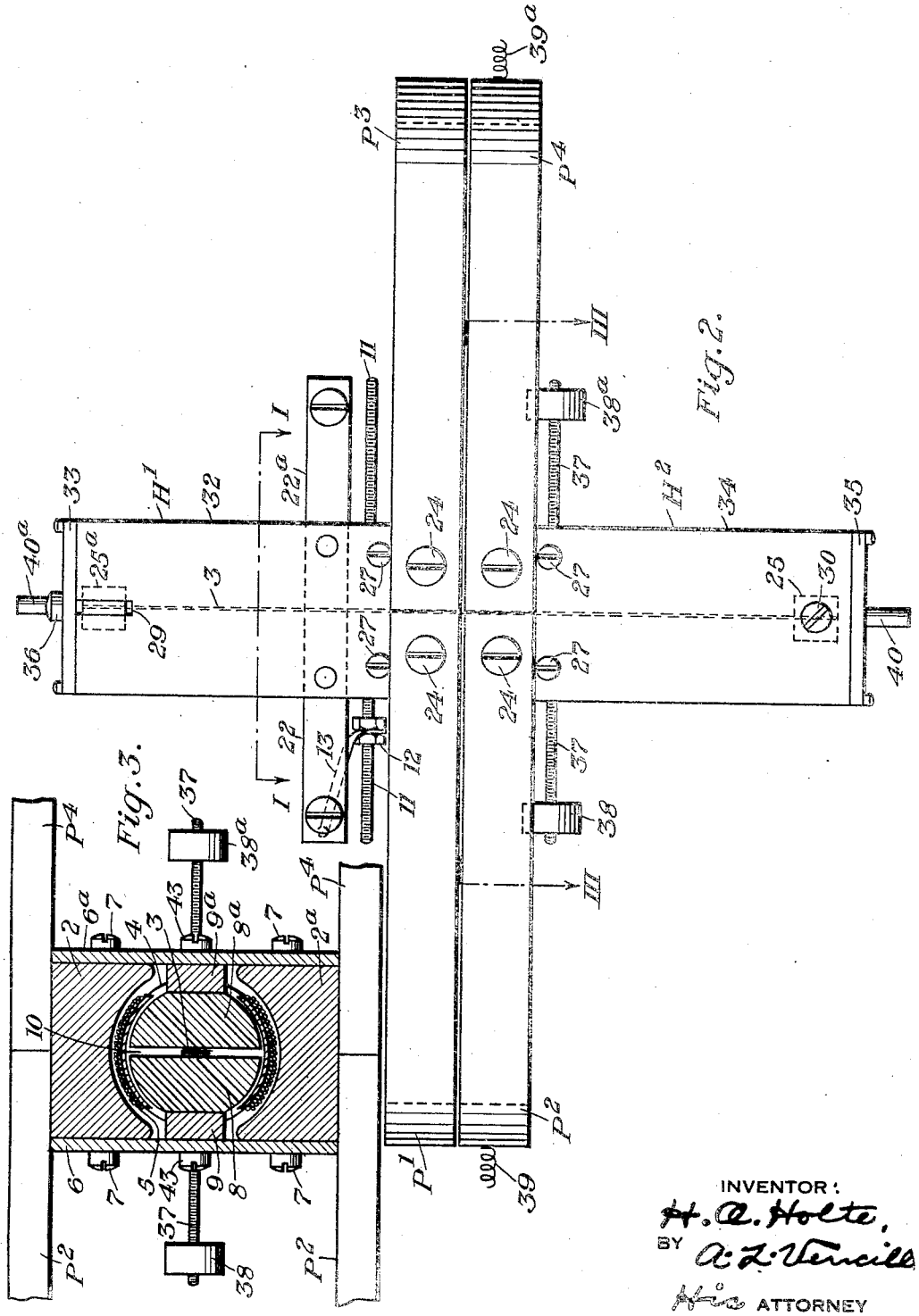

Dec. 3, 1929.                H. O. HOLTE                1,737,761
                        ELECTRORESPONSIVE DEVICE
                        Filed July 22, 1924        3 Sheets-Sheet 3
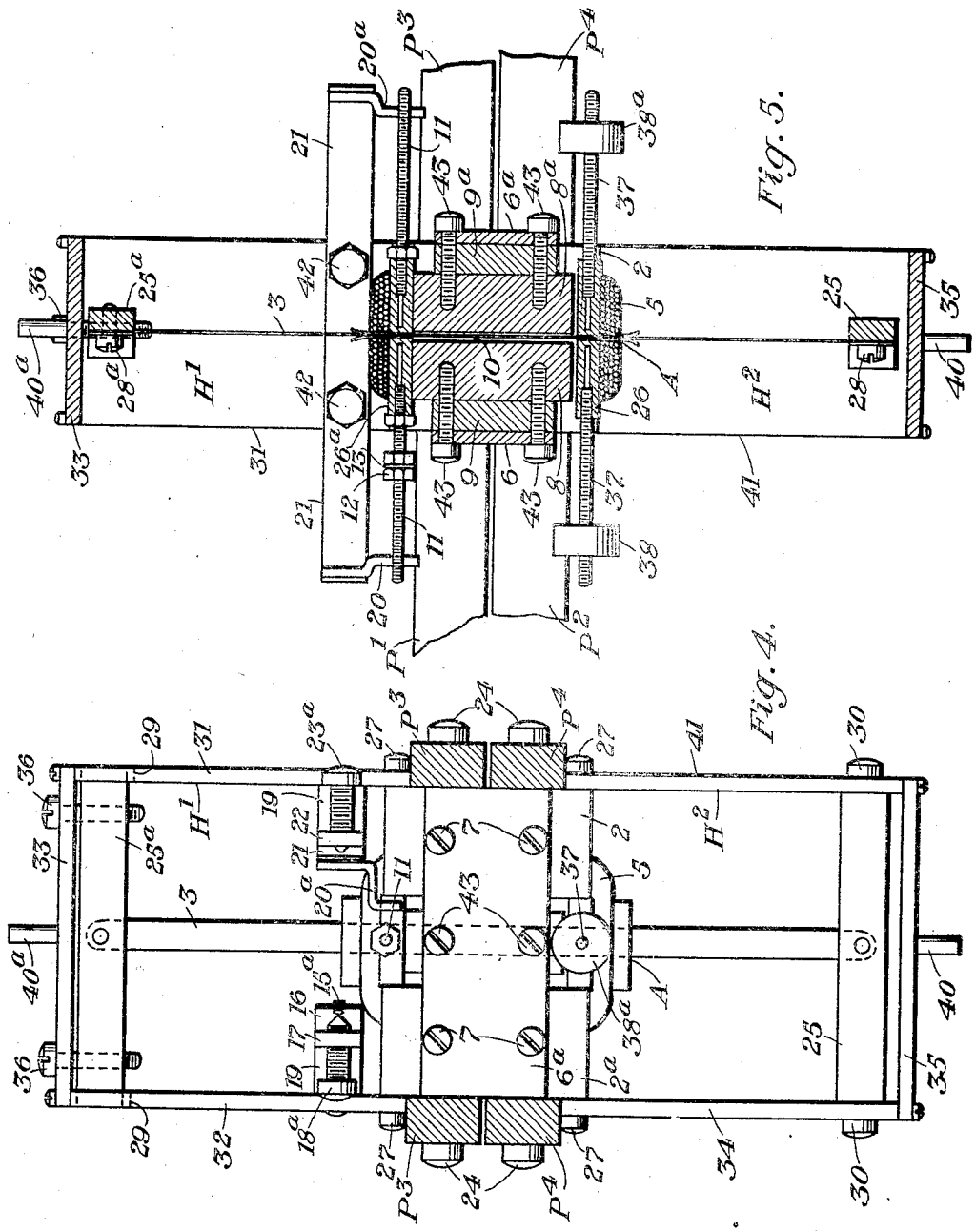

Patented Dec. 3, 1929

1,737,761

UNITED STATES PATENT OFFICE

HAROLD O. HOLTE, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRORESPONSIVE DEVICE

Application filed July 22, 1924. Serial No. 727,496.

My invention relates to electro-responsive devices. Devices embodying my invention are particularly well adapted for use as electrical relays, although they are not limited to this specific adaptation.

I will describe one form of device embodying my invention, and will then point out the novel features thereof in claims.

In the accompanying drawings, Fig. 1 is a top plan view sectioned on the line I—I of Fig. 2, and showing one form of electro-responsive device embodying my invention. Fig. 2 is a side view of the device shown in Fig. 1. Fig. 3 is a horizontal sectional view of the device on the line III—III in Fig. 2. Fig. 4 is an end view of the device shown in the preceding views and sectioned on the line IV—IV of Fig. 1. Fig. 5 is a sectional view on the line V—V of Fig. 1.

Similar reference characters refer to similar parts in each of the several views.

Referring to the drawings, the device comprises four permanent magnets $P'$, $P^2$, $P^3$ and $P^4$, each of which magnets is U-shaped, as shown in Fig. 1. The magnets $P'$ and $P^2$ are disposed in parallel relation one above the other, while the magnets $P^3$ and $P^4$ are similarly disposed in parallel relation one above the other. The magnets are further so disposed that the poles of magnets $P'$ and $P^2$ meet the poles of magnets $P^3$ and $P^4$, and that all four poles which meet each other are in each instance of the same polarity. This magnetic structure is provided with two pole pieces 2 and $2^a$, one of which is attached to one of the groups of four poles by screws 24 and the other of which is attached to the other group of four poles by screws 24. These pole pieces 2 and $2^a$ are located on the insides of the permanent magnets and the inner surfaces of the pole pieces are concaved, as shown in Figs. 1 and 3, to receive the operating parts of the device. It follows that one pole piece 2 will constantly be of one polarity, whereas the other pole piece $2^a$ will constantly be of the other polarity.

The pole pieces 2 and $2^a$ project slightly above and slightly below the upper and lower edges of the permanent magnets P to receive a superstructure $H'$ and an understructure $H^2$. The superstructure comprises two vertical plates 31 and 32 attached to the pole pieces 2 and $2^a$ respectively by screws 27, and a connecting horizontal plate 33 bridging the vertical plates at the top. The understructure $H^2$ comprises two vertical plates 34 and 41 attached to the pole pieces by screws 27, and a horizontal plate 35 bridging the two vertical plates at the bottom.

The superstructure and the understructure support a member 3 which is designed to be capable of rotational vibration. As here shown, this member is a thin flat strip of suitable metal, such as brass. The lower end of the strip 3 is attached to a bar 25 by means of a screw 28, and this bar is in turn attached to the two vertical plates 34 and 41 by screws 30. In other words, the bar 25 is located between the two vertical plates of the understructure and is near the bottom connecting plate 35. The upper end of the strip 3 is similarly attached to a bar $25^a$ by means of a screw $28^a$, and this bar $25^a$ is adjustably mounted in the superstructure $H'$. To accomplish this adjustable mounting the two vertical plates 31 and 32 are provided at their upper ends with vertical slots 29, and the cross bar $25^a$ is provided at each end with a projecting ear which enters the associated slot. These slots extend far enough down from the upper ends of the vertical plates to permit of considerable vertical movement of the bar $25^a$ in the slots. The bar $25^a$ is attached to the upper horizontal plate 33 by two screws 36 which pass through the upper plate and into threaded holes in the bar $25^a$. By turning the screws 36 the bar $25^a$ will be raised and lowered, thereby changing the tension on the strip 3.

The pole pieces 2 and $2^a$ carry two brass side plates 6 and $6^a$, each plate being attached to each pole piece by screws 7. Located between the two pole pieces (see Fig. 3) are two spaced blocks 8 and $8^a$ of soft iron, which blocks are attached to the plates 6 and $6^a$ by screws 43, each soft iron block being spaced from its associated side plate by a brass filler 9 or $9^a$. The strip 3 passes through the space between the two soft iron blocks 8 and $8^a$, this space being such that at no time does the strip come into contact with either block. The strip carries a head 26 immediately below the blocks 8 and 8ª, and another head 26ª immediately above these blocks, which heads, however, are located between the pole pieces 2 and 2ª. These heads are of non-magnetizable material, such as wood or fibre. Projecting in opposite directions from the lower head 26 are two screws 37, and projecting in opposite directions from the upper head 26ª are two screws 11.

The two heads 26 and 26ª form a drum to support a winding 5 terminating in leads 5ª and 5ᵇ (Fig. 1), whereby this winding may at times be supplied with alternating current. These two leads may be taken out to suitable terminal posts which are omitted from the drawing to simplify the disclosure.

It will be seen from the foregoing that the strip 3, together with the winding 5, the heads 26 and 26ª and the parts carried thereby, constitute a member A which is so mounted as to be capable of rotational vibration. It will also be seen that when alternating current is supplied to the winding 5 this member will tend to vibrate rotationally at the frequency of such alternating current due to the constant magnetic field in which the winding is located. The vertical tension on the strip 3 is preferably such that the natural frequency of rotational vibration of the entire member is the same as the frequency of the alternating current which is supplied to the winding 5.

The vertical member 31 of the superstructure H' carries a bar 22 which is spaced inwardly from this member by studs 19 of insulating material, and this bar 22 is in turn provided with a spring strip 21 which is held in place against the bar by the nuts 42 which hold the bar against the studs 19. Each end of the spring strip 21 carries a stop arm 20 or 20ª, designed to coact with the screws 11 to limit the rotational vibration of the member A. The positions of the stop arms 20 and 20ª are adjusted by means of screws 23 and 23ª, which pass through threaded holes in the bar 22 and force the corresponding ends of the spring strip 21 outwardly to the desired positions.

The vertical member 32 of the superstructure H' carries a bar 17 which is similar to the bar 22 and is likewise spaced from the member 32 by insulating studs 19. Associated with the bar 17 is a spring strip 16 which serves as a fixed contact member and for this purpose is provided with two contact tips 15 and 15ª. In the form here shown the contact tip 15ª is not used, but the contact tip 15 coacts with a contact tip 14 attached to the end of a contact spring 13 which in turn is fixed to one of the screws 11 by nuts 12. The parts are so adjusted that when the member A vibrates rotationally the contact 14—15 becomes closed at the end of each complete cycle of vibration. Any other form of circuit controlling means governed by the vibrating member A may, of course, be provided.

The screws 37 carry weights 38 and 38ª, which are adjustably mounted on the screw and which may be used to assist in tuning the member A to a natural frequency of rotational vibration equal to the frequency of the alternating current which is supplied to the winding 5.

The device in the form here shown has no iron in the moving parts, and so the polarizing field formed by the permanent magnets P may be made as powerful as desired without affecting the neutral position of the member A.

The member A has freedom of movement in two different ways. It may vibrate rotationally, and this rotational movement, as hereinbefore explained, is preferably tuned to a natural frequency equal to the frequency of the alternating current supplied to the device. The member A may also vibrate in a direction at right angles to the plane of the strip 3, and this vibration I will term "linear" vibration. This linear vibration cannot open and close the contact 14—15, and ordinarily the natural frequency of such vibration will not be the same as the frequency of the alternating current in winding 5. The strip 3 offers great resistance to bending edgewise, and so the member A cannot move to any appreciable extent in the direction at right angles to the linear movement hereinbefore referred to. It follows that any movement of member A edgewise with respect to strip 3 will not be sufficient to close the contact 14—15.

In the form here shown the upper and lower horizontal plates 33 and 35 are provided with pins 40 whereby the device as a whole may be mounted for pivotal motion on an axis which passes through the center of the strip 3. Oscillation of the device about this pivotal axis is limited by springs 39 and 39ª which may be attached to fixed members not shown in the drawings. The entire device will then have a natural frequency of rotational vibration, and if this frequency is less than the natural frequency of the member A, the operating member will not be set into rotational vibration with respect to the device itself by mechanical shocks.

One important feature of my invention is a wide thin strip in combination with circuit controlling means, the parts being so disposed that the circuit controlling means is effectively actuated only by rotational vibration of the strip.

Another important feature of my invention is the protection of the relay by pivoting the whole in such manner that the rotational vibration of the thin strip necessary to operate the circuit controlling means cannot be set up by mechanical shocks.

Although I have herein shown and described only one form of electro-responsive device embodying my invention, it is understood that various changes and modifications may be made therein within the scope of the appended claims without departing from the spirit and scope of my invention.

Having thus described my invention, what I claim is:

1. An electro-responsive device comprising a member mounted for rotational vibration around an axis through its center of mass and provided with a winding which is supplied at times with alternating current of a given frequency, said member being tuned for rotational vibration at the frequency of said alternating current, and means for passing magnetic flux through said winding.

2. An electro-responsive device comprising a member which includes a thin strip of metal fixed at both ends, and a winding, said member being tuned for rotational vibration at a given frequency, and means for passing magnetic flux through said winding.

3. An electro-responsive device comprising a member which includes a thin strip of metal fixed at both ends, and a winding which is at times supplied with alternating current of a given frequency, said member being mechanically tuned to vibrate rotationally at the frequency of said alteranting current, and means for passing magnetic flux through said winding.

4. An electro-responsive device comprising a member including a strip of metal, said member being mounted for rotational vibration at a given frequency around the longitudinal axis of said strip, means for applying rotational impulses to said member at said given frequency, and circuit controlling means actuated by rotational vibration of said member but not to linear vibration in a direction perpendicular to the plane of the strip.

5. An electro-responsive device comprising a member including a strip of metal mounted for rotational vibration and tuned to vibrate rotationally at a frequency which is different from any natural frequency of linear vibration that the member may have, and means for applying rotational impulses to said member at the frequency at which it is tuned for rotational vibration.

6. An electro-responsive device comprising a member mounted for rotational vibration at a frequency which is different from any natural frequency of linear vibration that the member may have, and means for applying to said member rotational impulses at the frequency at which the member is adjusted for rotational vibration.

7. An electro-responsive device comprising a member mounted for rotational vibration at a frequency which is different from any natural frequency of linear vibration that the member may have, means for applying to said member rotational impulses at the frequency at which the member is adjusted for rotational vibration, and circuit controlling means actuated by rotational vibration of said member but not by linear vibration thereof.

8. In combination, an electro-responsive device comprising a member mounted for rotational vibration at a given frequency, means within said device for applying to said member rotational impulses at said given frequency, and means for mounting said device so that it is free to vibrate as a whole about the axis of rotational vibration of said member, the natural frequency of rotational vibration of said member being different from any natural frequency of vibration of the device as a whole.

9. In combination, an electro-responsive device comprising a member mounted for rotational vibration at a given frequency, means within said device for applying to said member rotational impulses at said given frequency, and means for mounting said device so that it is free to vibrate as a whole about the axis of rotational vibration of said member, the natural frequency of rotational vibration of said member being higher than any natural frequency of vibration of the device as a whole.

10. An electro-responsive device comprising a member including a thin strip of metal and mounted for rotational vibration through the longitudinal axis of said strip, electromagnetic means for applying rotational impulses to said member, and means for varying the tension on said strip to vary the natural frequency of rotational vibration of said member.

11. An electro-responsive device comprising a member mounted for rotational vibration around an axis through its center of mass, electro-magnetic means for applying rotational impulses to said member, and adjustable weights associated with said member for varying the natural frequency of rotational vibration of said member.

12. An electro-responsive device comprising a member mounted for rotational vibration around an axis through its center of mass and including a thin strip of metal, electro-magnetic means for applying rotational impulses to said member, means for varying the tension on said strip to vary the natural frequency of rotational vibration of said member, and adjustable weights associated with said member for also varying the natural frequency of rotational vibration of said member.

13. An electro-responsive device comprising a thin strip of metal mounted for rotational vibration around its longitudinal axis, two spaced heads attached to said strip, a winding mounted on said heads, and means for passing magnetic flux through said winding.

14. An electro-responsive device comprising a thin strip of metal mounted for rotational vibration around its longitudinal axis, two spaced heads attached to said strip, a winding mounted on said heads, means for passing magnetic flux through said winding, and circuit controlling means associated with one of the said heads.

15. An electro-responsive device comprising a thin strip of metal mounted for rotational vibration, two spaced heads attached to said strip, a winding mounted on said heads, means for passing magnetic flux through said winding, and adjustable weights associated with one of said heads.

16. An electric-responsive device comprising a thin strip of metal mounted for rotational vibration, two spaced heads attached to said strip, a winding mounted on said heads, means for passing magnetic flux through said winding, and means associated with one of said heads for varying the natural frequency of rotational vibration of said strip.

17. An electro-responsive device comprising two constantly magnetized pole pieces of opposite polarities, soft iron located between said pole pieces but spaced therefrom, and a member mounted for rotational vibration and including a winding located between said pole pieces and said soft iron, said member being mechanically tuned to vibrate rotationally at a given frequency.

18. An electro-responsive device comprising two constantly magnetized pole pieces of opposite polarities, a soft iron element located between said pole pieces but spaced therefrom and provided with a slot, and a member mounted for rotational vibration and including a thin strip of metal fixed at both ends and passing through said slot and a winding located in the spaces between said pole pieces and said iron element.

19. An electro-responsive device comprising a metal strip mounted for rotational vibration around its longitudinal axis at a given natural frequency, an electromagnetic means for applying rotational impulses to said strip at said frequency.

In testimony whereof I affix my signature.

HAROLD O. HOLTE.